May 12, 1959 F. J. BRENNAN ET AL 2,886,290
PNEUMATIC DRILL SUPPORTING AND FEEDING APPARATUS
Filed July 5, 1955 2 Sheets-Sheet 2
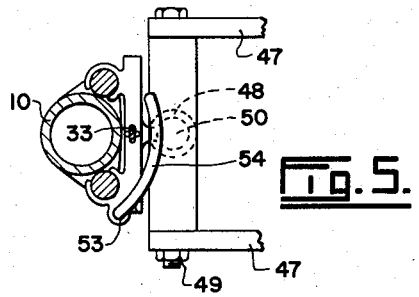
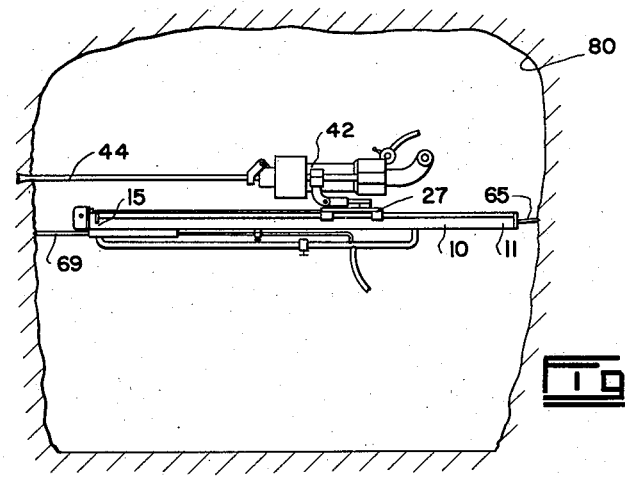
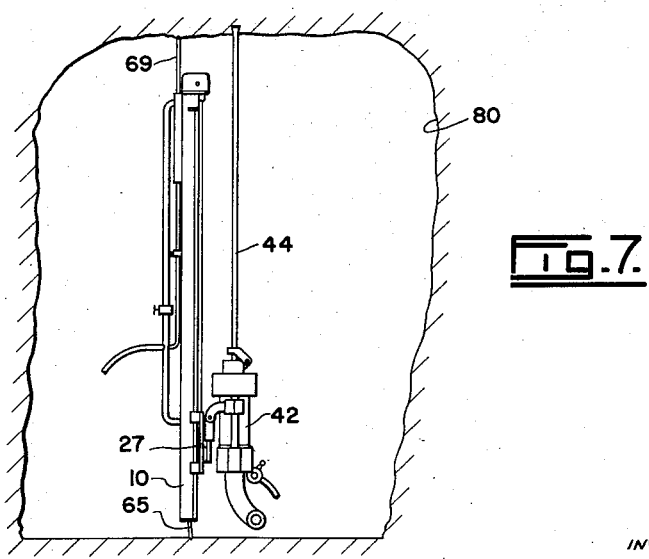
INVENTORS
FRANCIS JAMES BRENNAN
KARL HUSAAS CHRISTENSEN
BY
Fetherstonhaugh & Co.
ATTORNEYS United States Patent Office 2,886,290
Patented May 12, 1959

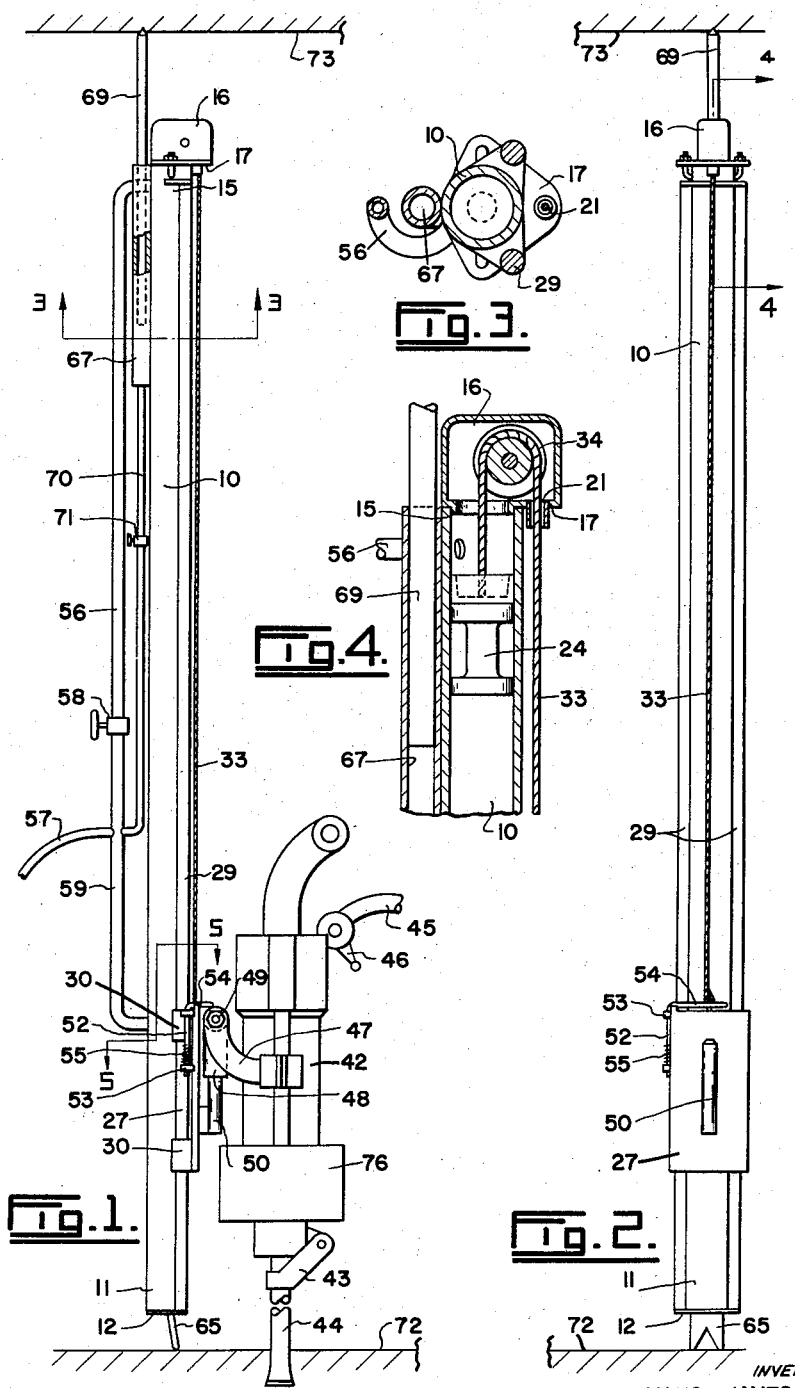

2,886,290

PNEUMATIC DRILL SUPPORTING AND FEEDING APPARATUS

Francis James Brennan and Karl Husaas Christensen, Van Anda, British Columbia, Canada Application July 5, 1955, Serial No. 520,060

Claims priority, application Canada July 9, 1954

2 Claims. (Cl. 255—45)

This invention relates to apparatus for supporting and feeding pneumatic drills of the type used in mining, quarrying, and construction work.

An object of the present invention is the provision of apparatus for supporting and feeding pneumatic drills so that the latter may be operated in any direction, that is, down, up, horizontal, etc.

Another object is the provision of apparatus for supporting and feeding pneumatic drills which eliminates the necessity of the operators holding the drill during this operation.

Another object is the provision of apparatus for feeding pneumatic drills which provides absolute control of the pressure of the drill bits against the bottom of the holes.

Yet another object is the provision of supporting and feeding apparatus of the nature described in which air pressure is used to counterbalance any desired portion of the weight of the drill.

A still further object is the provision of apparatus for supporting and feeding a pneumatic drill which, during down drilling, will allow the drill to settle slowly to the ground when a drill steel breaks.

The supporting and feeding apparatus according to this invention includes a long main cylinder closed at both ends upon which a carriage is slidably mounted for longitudinal movement thereof. Means is provided for securing a pneumatic drill to the carriage with the drilling end thereof extending in the direction of a cylinder end. A piston is slidably mounted in the cylinder and a cable extends from this piston slidably through a cylinder end and over a pulley to the carriage. The apparatus also includes means for directing air into the cylinder at the pulley end thereof. If the drilling end of the pneumatic drill extends in the direction of the pulley end of the cylinder, air in the main cylinder moves the piston therein to feed the drill in the direction of the hole being drilled. On the other hand, if the drilling end extends towards the opposite end of the cylinder, the pressure of the air against the piston lifts the carriage and pneumatic drill upwardly. In the latter case, the apparatus is usually set up for down drilling and it is helpful to provide a weight on the carriage or pneumatic drill to assist in this operation.

A foot may be projected from one end of the main cylinder, usually the end opposite the pulley end thereof. A small auxiliary cylinder may be secured to the main cylinder extending longitudinally thereof near the end remote from the foot. A prong plunger is slidably mounted in and projects outwardly from the auxiliary cylinder and beyond the adjacent end of the main cylinder. Means is provided for supplying air to the auxiliary cylinder to force the piston prong outwardly therefrom.

An example of this invention is illustrated in the accompanying drawings, in which, Figure 1 is a side elevation of the supporting and feeding apparatus with a pneumatic drill mounted thereon for down drilling, Figure 2 is a side elevation of the apparatus taken at right angles to Figure 1 and with the drill removed, Figure 3 is a section taken on the line 3—3 of Figure 1, Figure 4 is an enlarged fragmentary section taken on the line 4—4 of Figure 2, Figure 5 is an enlarged fragmentary section taken on the line 5—5 of Figure 1, Figure 6 diagrammatically illustrates the apparatus set up for horizontal drilling, and Figure 7 diagrammatically illustrates the apparatus positioned for up drilling.

Referring to the drawings, 10 is a long main cylinder which is closed at its end 11 by a cap or the like 12, and at its opposite end 15 by a housing 16 which completely closes said end. This housing projects a little beyond the side of the cylinder, as at 17, and has a restricted outlet 21 in said projection facing towards the opposite end of the cylinder, said outlet forming a constantly open air bleed. A piston 24 is slidably mounted in the main cylinder and movable from end to end thereof.

A carriage 27 is slidably mounted on the cylinder 10 for longitudinal movement thereof in any desired manner. In this example, two spaced guide rails 29 are mounted at their opposite ends on the opposite ends of the cylinder and are spaced therefrom and parallel therewith. The carriage 27 has a plurality of sleeves 30 which are slidably mounted on these rails. A light steel cable 33 connected at one end to the carriage extends through the outlet 21 into housing 16 and over a pulley 34 rotatably mounted within the latter and into the cylinder where it is connected at its opposite end to piston 24. The cable almost fills the outlet, see Figure 4. When the carriage 30 is located at the end 11 of the cylinder, the piston is spaced a little from the cylinder end 15, as shown in Figure 4.

This apparatus may be used with pneumatic drills of any desired construction. One type of drill is diagrammatically illustrated at 42, said drill having the usual chuck 43 at one end for receiving the end of a drill steel 44. As is well known, these drill steels come in sections which are removably secured to each other as the hole being drilled deepens. Air for operating the drill is supplied through a hose 45 from a suitable source, not shown, this air being controlled by a valve 46. This particular type of drill has a pair of arms 47 projecting outwardly from one side thereof, carrying a sleeve 48 at their outer ends. This sleeve is pivotally mounted on the ends of these arms by means of a bolt 49. The carriage 27 has a prong 50 which extends parallel with the main cylinder towards its end 15, said prong being adapted to fit into the sleeve 48, as clearly shown in Figure 1. A suitable latch is provided for keeping the sleeve on the prong. This may be in the form of a clamping rod 52 rotatably mounted in lugs 53 projecting from the carriage. This rod has a finger 54 at one end which projects outwardly over the free end of the prong 50 so that when the sleeve 48 is on the latter, the finger overlaps the outer end thereof to prevent the drill from being lifted off the prong. A spring 55 on rod 52 resiliently retains the finger in this position, but allows it to be swung away from the sleeve in order that the drill may be removed. One end of this spring is connected to the rod and the other end thereof to one of the lugs 53.

Air under pressure from a suitable source, not shown, is supplied to the end 15 of the main cylinder 10 in any convenient manner. In this example, a substantially U-shaped pipe 56 is connected at one end to the side of the cylinder near the end 15 thereof, and at its opposite end near the cylinder end 11. One end only of the pipe communicates with the interior of the cylinder, and that is the end at the cylinder end 15. A hose 57 is connected to this pipe at a point spaced from the opposite ends thereof, and a control valve 58 is located in the pipe between this hose and the cylinder end 15. The portion 59 of the pipe acts as a handle for the cylinder.

A foot 65 projects from the end 11 of the main cylinder, and a small auxiliary cylinder 67 is secured to and extends longitudinally of the main cylinder near its opposite end. A prong plunger 69 is slidably mounted in and projects outwardly from the auxiliary cylinder and beyond the adjacent end 15 of the main cylinder. The inner end of the auxiliary cylinder is brought into communication with the pipe 55 near the hose 57 by a small pipe 70, said pipe having a control valve 71 therein. This control valve is the well-known type that is turned in one direction to permit air to travel through pipe 70 to the auxiliary cylinder, and in the opposite direction to close off the air flow and allow air from the cylinder to discharge to atmosphere.

Figures 1 and 2 show the supporting and feeding apparatus set up for down drilling. Assuming that the apparatus is operating in a mine tunnel, 72 is the bottom or floor of the tunnel, while 73 is the roof thereof. The foot 65 is placed on the floor 72 and the main cylinder 10 held in a vertical position near the point where the hole is to be drilled. The valve 71 is operated to permit air to flow into the auxiliary cylinder 67 to force the prong plunger 69 upwardly into the roof 73. Suitable means, not shown, may be provided to lock the prong in this position, or the air pressure may be left on the auxiliary cylinder to keep the prong extended. The pneumatic drill 42 may now be mounted on the carriage 27 with its drill end extending in the direction of the end 11 of the main cylinder, or, in other words, downwardly. When it is desired to raise the drill, valve 58 is operated to permit air to enter the upper end of the main cylinder, thus driving piston 24 downwardly, air escaping from the end 11 of the cylinder at this time as is customary in equipment of this nature. As there is a constant bleed of air through the restricted outlet around the cable, the air pressure must be kept on the main cylinder as long as the drill is to be retained in an elevated position. The required drill steel 44 is attached to the drill by the chuck 43. It is preferable to attach a heavy weight 76 on to the drill or carriage in order to increase the downward pressure on the drill steel. The air pressure in the main cylinder may now be reduced to allow the drill to move downwardly until the bit at the end of the steel engages the tunnel floor 72. The air pressure may be cut off to allow the full weight of the drill and the weight 76 to press the steel downwardly, or any desired portion of this weight may be counterbalanced by controlling the valve 58 to maintain a desired pressure against the main cylinder piston 24. This allows for control of the pressure of the drill bit against the bottom of the floor. As air is constantly escaping through the restricted outlet 21, sufficient air must be supplied to the main cylinder to allow for this so that there is always a movement of air through the cylinder instead of a static body therein. If the drill happens to be in a raised position when the air supply is cut off, it will gradually sink downwardly as the air escapes through the air bleed. Another advantage lies in the fact that if the drill steel were to break during operating, the comparatively heavy drill 42 will not drop to the floor, but it will gradually sink downwardly as the air above the main cylinder piston is compressed and emerges through the air bleed. When it is desired to pull the steel from the hole, sufficient air pressure is applied to the main cylinder to force the piston thereof downwardly, thus raising the drill. If it is desired to add another drill steel, the drill may be disconnected from the steel in the hole and the drill raised sufficiently to allow the new steel to be inserted in the chuck thereof, after which the new steel is connected to the steel in the hole in the usual manner.

Figure 6 diagrammatically illustrates the apparatus set up for operation in a horizontal position in a tunnel 80. The foot 65 is pressed against one side wall of the tunnel while the prong plunger 69 is driven against the opposite wall in the manner described above. In this case, the drill 42 is turned around so that the drilling end thereof extends in the direction of the pulley end of the main cylinder. In order to turn the drill around, it is only necessary to swing finger 54 out of the way and to lift the drill to move sleeve 48 off prong 50 of carriage 27. The drill is then turned over and the sleeve is swung around bolt 49, after which the sleeve is replaced on the prong and finger 54 returned to its holding position, said sleeve being shown in this new position in Figures 6 and 7. With this arrangement, the air pressure against piston 24 in the main cylinder moves carriage 27 and the drill to feed the steel into the hole. The pressure of the drill bit against the bottom of the hole is regulated by means of valve 58. The air bleed 21 makes this a very sensitive control.

Figure 7 diagrammatically illustrates the apparatus set up in tunnel 80 for up drilling. In this case, foot 65 bears against the bottom of the tunnel, and the prong plunger 69 is driven into the roof thereof, as in Figure 1. In this case, however, the drill 42 is turned around relative to its position in Figure 1, that is, the drill end thereof extends in the direction of the pulley end of the main cylinder. The control and operation of this apparatus is the same as for the set up shown in Figure 6.

What we claim as our invention is:

1. Pneumatic drill supporting and feeding apparatus comprising a long main cylinder, a carriage slidably mounted for longitudinal movement on the cylinder, means for securing a pneumatic drill to the carriage with the drilling end thereof extending in the direction of a cylinder end, a piston slidably mounted in the cylinder, a hollow housing mounted on and closing one end of the cylinder, a pulley rotatably mounted in the housing, a restricted outlet in the housing clear of the cylinder, a cable connected to and extending from the piston through the open end of said cylinder over the pulley and through the outlet to the carriage, said cable being connected to the carriage, and means for directing air into the cylinder at the pulley end thereof to move the piston away from the latter end, said outlet forming a constantly open air bleed through which air passes from the cylinder around the cable while air is being directed into said cylinder, and when the air supply is shut off the bleeding of the air from the cylinder permitting the piston to move towards the pulley end of the cylinder.

2. Pneumatic drill supporting and feeding apparatus comprising a long main cylinder, a carriage slidably mounted for longitudinal movement on the cylinder, means for securing a pneumatic drill to the carriage with the drilling end thereof extending in the direction of a cylinder end, a piston slidably mounted in the cylinder, a hollow housing mounted on and closing one end of the cylinder, a pulley rotatably mounted in the housing, a restricted outlet in the housing clear of the cylinder, a cable connected to and extending from the piston through the open end of said cylinder over the pulley and through the outlet to the carriage, said cable being connected to the carriage means for directing air into the cylinder at the pulley end thereof to move the piston away from the latter end, said outlet forming a constantly open air bleed through which air passes from the cylinder around the cable while air is being directed into said cylinder, and when the air supply is shut off the bleeding of the air from the cylinder permitting the piston to move towards the pulley end of the cylinder, a foot projecting from one end of the main cylinder, a small auxiliary cylinder secured to the main cylinder extending longitudinally thereof near its opposite end, a prong plunger slidably mounted in and projecting outwardly from the auxiliary cylinder and beyond the adjacent end of the main cylinder, means for supplying air to the auxiliary cylinder to force the piston prong outwardly therefrom, and valve means for selectively controlling the flow of air to the auxiliary cylinder and releasing air therefrom.

References Cited in the file of this patent

UNITED STATES PATENTS

| | | |
|---|---|---|
| 1,069,289 | Prellwitz | Aug. 5, 1913 |
| 1,747,869 | Hansen | Feb. 18, 1930 |
| 1,834,701 | Gustafson | Dec. 1, 1931 |
| 1,981,475 | Smith | Nov. 20, 1934 |
| 2,046,648 | Murphy | July 7, 1936 |
| 2,075,706 | Curtis | Mar. 30, 1937 |
| 2,094,124 | Huffman | Sept. 28, 1937 |
| 2,212,329 | Smith | Aug. 20, 1940 |